UNITED STATES PATENT OFFICE.

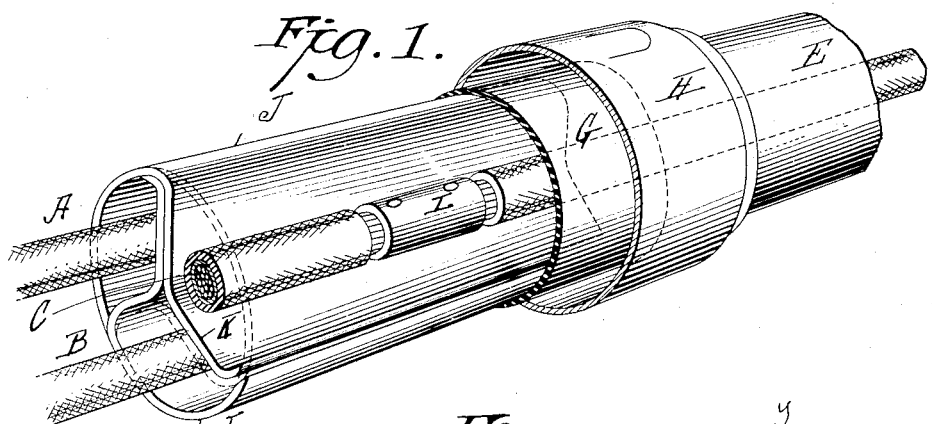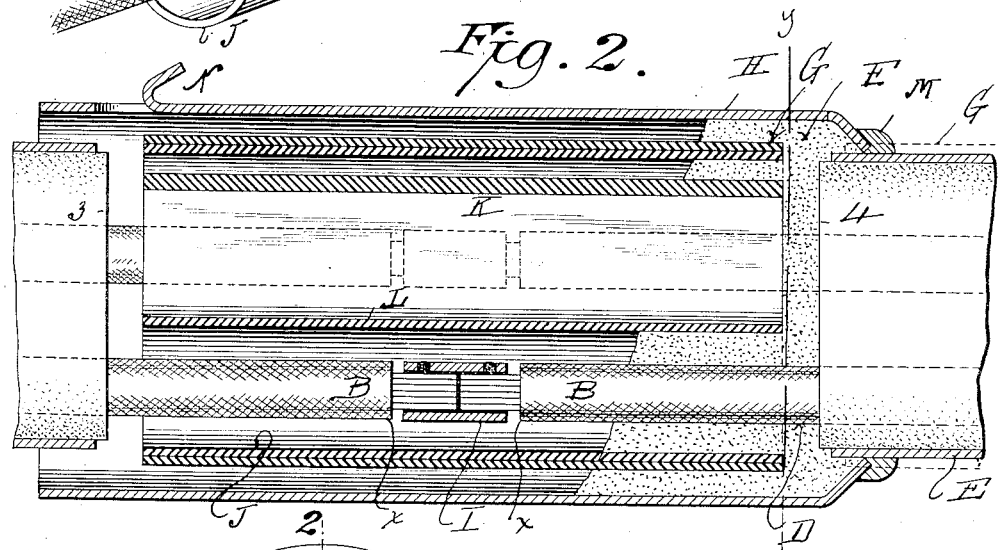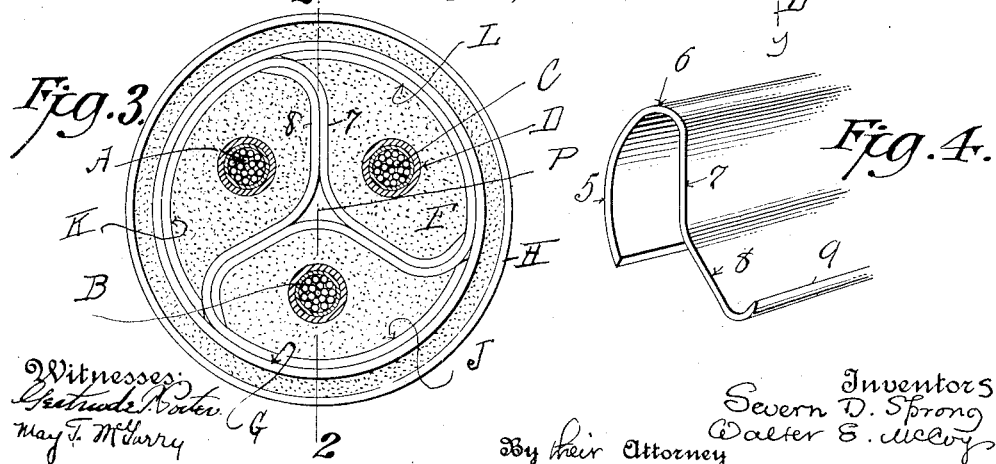

SEVERN D. SPRONG AND WALTER E. McCOY, OF NEW YORK, N. Y.

MEANS FOR PREVENTING CURRENT LEAKAGE IN ELECTRIC CABLES.

1,165,141.   Specification of Letters Patent.   Patented Dec. 21, 1915.

Application filed February 12, 1915. Serial No. 7,850.

*To all whom it may concern:*

Be it known that we, SEVERN D. SPRONG and WALTER E. McCOY, citizens of the United States, residing at New York, in the county of New York and State of New York, have invented a certain new and useful Improvement in Means for Preventing Current Leakage in Electric Cables, of which the following is a specification.

The invention relates to the prevention of current leakage in electric cables, especially at joints.

The principle of our invention is so to construct the cable covering as that a high dielectric strength of the insulation between the several conductors and between each conductor and the outer sheath—hence ground—will be attained, without materially changing the diameter of the cable. This we effect by means of three plates of insulating material of high dielectric strength, each of which is bent longitudinally to a peculiar shape, hereinafter described, which permits of their being severally placed upon the conductors, and if at joints, after the joints are formed. The plates are then brought together, and by reason of their shape are interlocked so as to produce an envelop of tubular shape having longitudinal partitions dividing the internal space into compartments—one of the conductors being received in each of said compartments. The plates thus assembled are placed in a sleeve of insulating material which holds them together, and the whole is inclosed in the usual cable sheath, which is filled with an insulating compound, introduced in a viscid or plastic state and allowed to harden.

In the accompanying drawings—Figure 1 is a perspective view of a three-conductor cable, embodying our invention, with parts cut away to show internal construction. Fig. 2 is a longitudinal section on the line 2, 2 of Fig. 3. Fig. 3 is a transverse section on the line $y$, $y$ of Fig. 2. Fig. 4 is a perspective view of a portion of one of the bent plates J.

Similar letters and numbers of reference indicate like parts.

The cable here shown comprises three metallic conductors A, B, C, each having the usual insulating cover D, and all inclosed in a sheath E, usually of lead. The space within the sheath not occupied by said conductors is filled with an insulating compound F, introduced in a plastic or fluid state and allowed to harden. We will explain the operation of forming and covering the joint with reference to one of said conductors, it being the same for all. The sheath is cut away and then the insulating filling compound, as shown at 3 and 4, so as to expose a sufficient length of the cover D, which in turn is cut away, as shown at $x$, $x$, so as to expose the naked wires of the conductor B, B. Upon the sheath E of one part of the cable is slid a tube G of fiber or other insulating material which is pushed back on said sheath, as shown in dotted lines, Fig. 1, so as to be well away from the joint. Upon the tube G is placed a section of lead sheathing H, and this is also slid back from the joint in the same way as is tube G. The ends of conductor B, B being cut off square and approximated face to face, are inserted in a short copper sleeve I, having openings through which molten tin or solder is run. Said tin binds the said approximated ends together and fills the annular space between said sleeve and said wires and also the openings in said sleeve. We then place upon the conductor a plate J of insulating material of high dielectric strength, which is bent longitudinally, as shown in Fig. 4. The part 5 of said plate is arc-shaped and is united by a curved portion 6 to a substantially straight portion 7, thus forming a loop. The portion 7 is followed by an inclined portion 8, disposed at an angle to portion 7 and diverging from said loop. Preferably on the outer edge of part 8 is an upturned lip or flange 9. When three of these plates, J, K, L, are placed together, as shown in Fig. 2, the parts 5 unitedly form a cylinder or tube, in which the remaining parts form partitions in which the part 7 of one plate lies against the part 8 of the next adjacent plate, Fig. 3, dividing the space inside of said cylinder into three compartments. The bent plates J are placed on the conductors after the joints therein are made, and then they are brought together and interlocked, as shown in Fig. 3. We then slide the tube G longitudinally until it covers said plates J, K, L and holds them in position. We then bend inwardly the extremities of the tube section H until they meet sheath E, and between said extremities and said sheath we form with solder a wiped joint, as shown at M. An opening is made in tube H by suitably cutting the wall thereof and bending back the same, as shown at N, Fig. 2. Through said opening is poured viscid or plastic insulating compound, which then fills all the open spaces within said sheath and there hardens.

As best shown in Fig. 3, each conductor lies in one of the compartments formed by the plates J, K, L, and is embedded in the introduced insulating compound. The partitions formed by the interlocking plates are double, except at the center of the cross section, where there may be an air space P, which is insulating. So also the wall formed by the plates J, K, L and the inclosing tube G is double. As the material of both plates and inclosing tube is to be of high dielectric strength, it is obvious that any creeping of current from conductor to conductor or from any conductor to ground is effectually prevented, while at the same time the cross sectional area of the cable at the joint is but little augmented beyond its dimensions elsewhere. It is to be particularly noted that the plates J, K, L are simply looped upon the jointed conductor, thus avoiding any necessity of threading a tubular cover upon one exposed end of said conductor before the joint is made.

Instead of employing a tube, as G, to hold the interlocked plates J, K, L together, we may omit said tube and unite the plates by cement applied to their contacting surfaces, or we may use both said tube and said cement. So also instead of a continuous inclosing tube, we may secure said plates by inclosing rings or bands disposed at intervals apart upon them.

We claim:

1. An electric cable, comprising a plurality of line conductors, plates of insulating material longitudinally bent to inclose said conductors and mutually to interlock, means for holding said plates in interlocked position and a mass of insulating material filling the interstices between said plates and said conductors.

2. An electric cable, comprising a plurality of line conductors, plates of insulating material longitudinally bent to inclose said conductors and mutually to interlock, and a tube fitting upon and inclosing said plates and retaining the same in interlocked position.

3. An electric cable, comprising a plurality of plates of insulating material longitudinally bent mutually to interlock and produce a cylindrical receptacle divided into compartments, line conductors in said compartments, and a tube of insulating material fitting upon and inclosing said plates and retaining the same in interlocked position.

4. An electric cable, comprising a plurality of plates of insulating material longitudinally bent mutually to interlock and produce a cylindrical receptacle divided into compartments, line conductors in said compartments, a tube of insulating material fitting upon and inclosing said plates and retaining the same in interlocked position, and a filling of insulating material in said compartments and embedding said conductors.

5. As a new article of manufacture and sale, an insulating cover for the conductors of an electric cable, comprising a plurality of plates of insulating material, each longitudinally bent to produce an arc-shaped portion, a portion forming a loop with said arc-shaped portion and a portion in continuation of said second portion and disposed at an angle thereto and diverging from said loop, the said plates being of like dimensions and capable of being interlocked to form a hollow cylindrical body divided into a plurality of compartments.

6. As a new article of manufacture and sale, an insulating cover for the conductors of an electric cable, comprising a plurality of plates of insulating material, each longitudinally bent to produce an arc-shaped portion, a portion forming a loop with said arc-shaped portion and a portion in continuation of said second portion and disposed at an angle thereto and diverging from said loop and having at its edge a turned-up flange portion, the said plates being of like dimensions and capable of being interlocked to form a hollow cylindrical body divided into a plurality of compartments.

7. An electric cable, comprising an inclosing tube, a plurality of longitudinal partitions of insulating material therein dividing the entire space within said tube into compartments, a line conductor in each compartment, and a filling of insulating compound in each compartment and embedding said conductors.

8. An electric cable, comprising an inclosing tube of insulating material, a plurality of longitudinal partitions of insulating material therein dividing the entire space within said tube into compartments, a line conductor in each compartment, a metal sheath for said cable, and a filling of insulating compound in the space between said insulating tube and said sheath and said compartments and embedding said conductors.

9. An electric cable, comprising an inclosing tube, a plurality of longitudinally bent plates, each composed in part of an arc-shaped portion fitting against the inner surface of said tube and in part of a curved portion extending across said tube, the said plates being interlocked substantially as set forth to form longitudinal partitions within said tube dividing the same into compartments, and in each of said compartments a line conductor, and a filling of insulating compound embedding said conductor.

10. An electric cable, comprising an inclosing tube of insulating material, a plurality of longitudinally bent plates, each composed in part of an arc-shaped portion fitting against the inner surface of said tube, and the said arc-shaped portions unitedly forming a lining for said tube, and in part of a curved portion extending across said tube and making contact with the inner periphery of the next adjacent plate, the said plates being interlocked substantially as set forth to form longitudinal partitions within said tube dividing the same into compartments, and in each of said compartments a line conductor, and a filling of insulating compound embedding said conductor.

In testimony whereof we have affixed our signatures in presence of two witnesses.

SEVERN D. SPRONG.
WALTER E. McCOY.

Witnesses:
GERTRUDE T. PORTER,
MAY T. McGARRY.